(12) United States Patent
Cargemel et al.

(10) Patent No.: US 6,480,933 B1
(45) Date of Patent: Nov. 12, 2002

(54) DISK CACHE DEVICE AND METHOD FOR SECURE WRITING OF HARD DISKS IN MASS MEMORY SUBSYSTEMS

(75) Inventors: Laurent Cargemel, Avrille; Daniel Carteau, Montigny le Bretonneux; Jacques Delepoulle, Saint Germain de la Grange, all of (FR)

(73) Assignee: Bull S.A., Louveciennes (FR)

( * ) Notice: Subject to any disclaimer, the term of this patent is extended or adjusted under 35 U.S.C. 154(b) by 0 days.

(21) Appl. No.: 09/582,875
(22) PCT Filed: Oct. 28, 1999
(86) PCT No.: PCT/FR99/02631
§ 371 (c)(1),
(2), (4) Date: Jul. 6, 2000
(87) PCT Pub. No.: WO00/28422
PCT Pub. Date: May 18, 2000

(30) Foreign Application Priority Data

Nov. 6, 1998 (FR) .............................. 98 13987

(51) Int. Cl.$^7$ .............................................. G06F 12/16
(52) U.S. Cl. ...................................................... 711/113
(58) Field of Search .................................. 711/113, 138, 711/139; 713/340

(56) References Cited

U.S. PATENT DOCUMENTS 5,448,719 A * 9/1995 Schultz et al. ......... 395/182.03
5,809,311 A * 9/1998 Jones ..................... 395/750.01
5,937,433 A * 8/1999 Lee et al. .................... 711/158
6,076,142 A * 6/2000 Corrington et al. ......... 711/114

FOREIGN PATENT DOCUMENTS

EP    0 342 846 A    11/1989
EP    0 573 307 A    12/1993
EP    0 744 696 A    11/1996

OTHER PUBLICATIONS

Patent Abstracts of Japan, vol. 095, No. 002, Mar. 31, 1995; & JP 06 309232 A (Hitachi Ltd), Nov. 4, 1994, Abstract.

* cited by examiner

Primary Examiner—Kevin L. Ellis
(74) Attorney, Agent, or Firm—Edward J. Kondracki; Miles & Stockbridge P.C.

(57) ABSTRACT

A disk cache device for secure writing comprising a backup power supply source (62) for supplying backup power for a given duration to a computer system fed by two main electric power supply devices (60, 61) and comprising at least one hard disk drive (1a, 1b, 1c), and a host system (3). All of the disk drives (1a, 1b, 1c) are linked by a bus (2) to a connection (30) of the host system (3) (host bus adapter), and a monitor (50) for monitoring at least the backup electric power supply source (62) and the main power supply devices (60, 61). Monitors (50) are connected to the interface (2) and can be interrogated by an interrogator (31) for interrogating the host system (3) so that the latter can enable the write disk cache function, or not, in the write commands to be sent to the disk drives (1a, 1b, 1c) in accordance with the information gathered by the monitoring means (50).

29 Claims, 2 Drawing Sheets

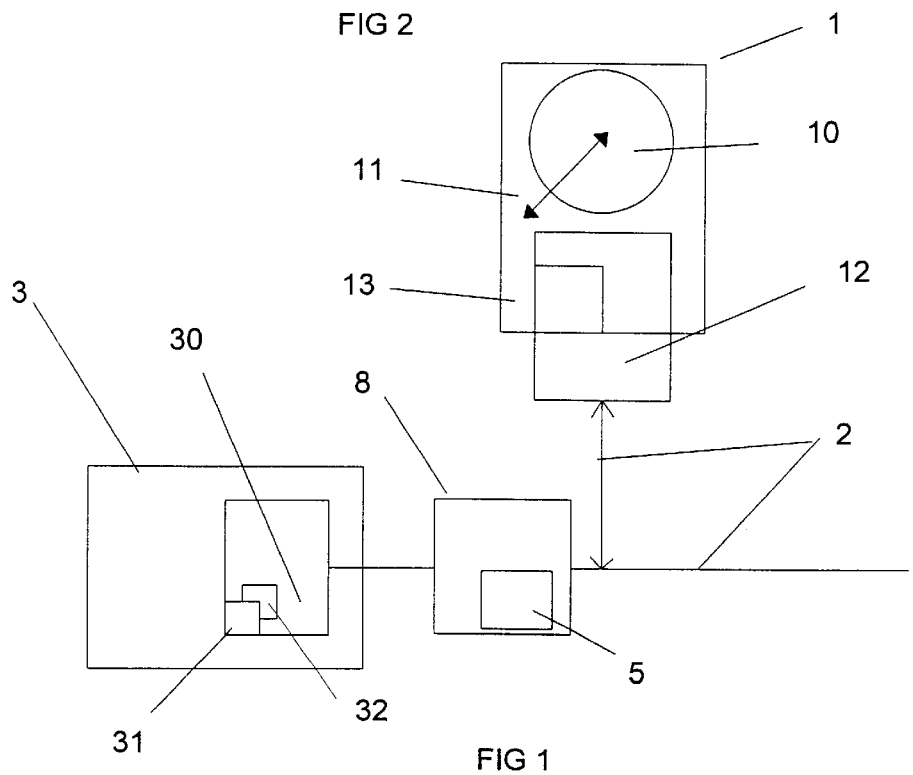
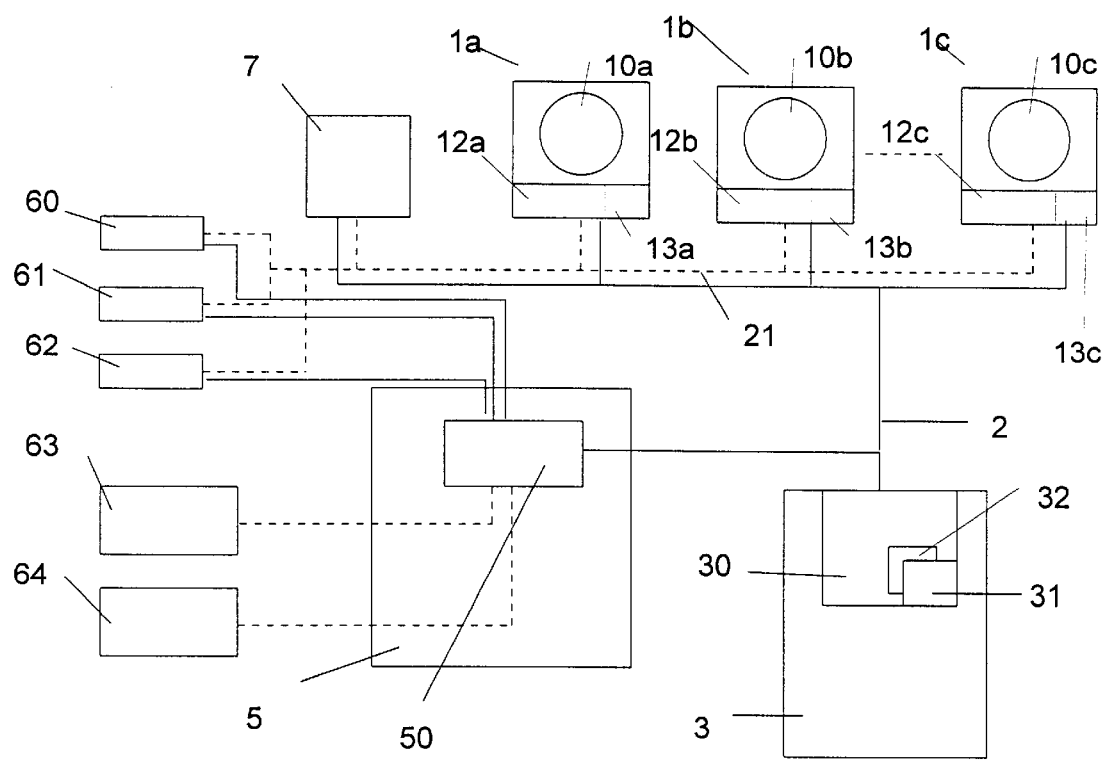

DISK CACHE DEVICE AND METHOD FOR SECURE WRITING OF HARD DISKS IN MASS MEMORY SUBSYSTEMS

BACKGROUND OF THE INVENTION

1. Field of the Invention

The present invention relates to a write-protected disk caching device and process for mass storage subsystem hard disks. This device and this process can also be used individually on a computer hard disk.

2. Description of Related Art

A hard disk drive (1) of the prior art, represented by FIG. 3A, is essentially constituted by a magnetic medium (10), means for reading and writing (11) on this magnetic medium linked to a volatile memory (13), called a "cache memory" by one skilled in the art, which will hereinafter be called a disk cache. The hard disk drive is linked to a host system (3) by an interface (12) and by a bus (2) between the interface and a bus adapter circuit (30) (host bus adapter: HBA) of the host system (3). The adapter circuit (30) makes it possible to connect the bus of the host system (3) to the SCSI bus (2) and is controlled by a connection driver. The system (3) itself may be equipped with a cache memory called a system cache. A disk normally operates in the following way. First, the user of the system can access the data present on the disk, either through a write operation or a read operation.

When the system sends a read command to the disk drive comprising, for example, the number of the first block to be read and the total number of blocks to be read, the disk drive that receives this command through the interface searches for the data, reads it, and puts it in the disk cache. Once the information is in the cache, the disk drive sends a message to the system to indicate that the data is ready to be sent. The system responds with a command for initiating the sending of the data.

The write operation starts by putting the data to be written into the system cache, after which the system sends a write command to the disk drive. When the disk drive is ready to receive the data, it informs the system, which then transmits the data to the disk drive, passing through the adapter (HBA), the SCSI bus, then the disk drive interface. The data received by the disk drive is then stored in the disk cache. Then, the disk drive performs the actual writing of the data from the cache onto the magnetic medium (10). Once the writing, as well as any possible write verification and/or error correction operation is finished, the disk drive sends a message "FIN OK" through the interface to indicate to the system that the disk is again ready to receive data. This write procedure effectively preserves the integrity of the data, since as long as the data has not actually been written onto the magnetic medium, the disk drive does not send the message "FIN OK," and therefore the system maintains the data in its system cache. Thus, even if some type of failure occurs during the writing onto the magnetic medium, for example due to a malfunction of the disk drive or an electric power failure, the message "FIN OK" will not be sent, but the data will be saved in the system cache.

However, it is clear that this procedure inhibits the system and thus slows down its operations until the write operation is finished, i.e., until the message "FIN OK" is sent by the disk drive.

In the prior art, there are known possibilities for improving the performance of a disk. First, the performance of the disk can be increased by modifying the architecture of the disk. However, this solution is very expensive and can only be implemented by disk manufacturers.

The read performance can be improved by sending the cache of the disk more data (for example one page) than what is requested by the system. Thus, when the system subsequently requests other data from the page stored in the cache, it will already be present in the cache of the disk, and can be accessed faster by the system.

The write performance of the disk drive can be improved by actually using the cache of the disk to mask an operation. For this reason, a functionality called a write cache function, which already exists in the disks of the prior art, consists of sending the message "FIN OK" as soon as the data transmitted by the system is in the cache of the disk. Thus, the write operation is performed during the sending of the next data, resulting in a substantial increase in performance. However, this technique has the major drawback of not preserving the integrity of the data.

In fact, in certain types of incidents, the data will not be written or will be only partially written onto the disk, without its being possible to recover the lost data. For example, if a failure of the electric power supply of the disk drive occurs after the message "FIN OK" has been sent by the disk drive to the system, but before the complete writing of the data from the disk cache onto the magnetic medium, this data will be lost. In fact, the disk cache being volatile memory, the data are erased as soon as the disk cache is no longer supplied with electricity. Since the message "FIN OK" has been sent by the disk drive and received by the system, the system has dumped its system cache in order to store the data of the next write operation and it no longer has the data that had been in the disk cache. This drawback is all the more critical in that it can occur unnoticed, for example when the power failure is of very short duration (micro-interruption). Thus, not only is the data permanently lost, but this lost goes undetected by the system. This major drawback in the use of the disk cache in writing expressly prohibits the use of the cache as described above when the integrity of the data must be preserved.

There are other solutions that use the caching function for writing, but they are costly and complex, since they require the use of a controller function or the use of an additional cache as well as its management and protection.

SUMMARY OF THE INVENTION

Hence the object of the present invention is to eliminate the drawbacks of the prior art by offering a device that makes it possible to use the disk cache function for writing in order improve the write performance of a disk, without the risk of a data loss.

This object is achieved through the fact that the write-protected disk caching device comprises a host system linked by an adapter (host bus adapter) of the host system to a bus, an interface and at least one hard disk drive, means for supplying backup power for a given duration, and at least one main device for supplying electric power to the disk drive comprising means for monitoring at least the backup [note: claim 1] electric power supply means and the main power supply devices, the device being characterized in that the monitoring means can be interrogated by interrogation means of the host system so that the latter can enable the write disk cache function, or not, in the write commands to be sent to the disk drives, in accordance with the information gathered by the monitoring means.

According to another characteristic, the information gathered by the monitoring means represents the operating state of the main power supplies and of the backup power supply means.

According to another characteristic, the write disk cache function is enabled by the host system in the write commands as long as the main power supplies and the backup power [note: claim 3] supply means are operational.

According to another characteristic, the host system initiates the writing of the data contained in all the disk caches onto the respective magnetic disks as soon as the information gathered by the monitoring means indicates that the main power supplies or the backup power supply means have failed.

According to another characteristic, the interrogation means comprise an agent installed at a level higher than that of the connection driver of the host system adapter, which agent performs a polling of the monitoring means at a given time interval and sets a flag indicating whether or not the write disk cache function is authorized, this flag being consulted by the connection driver of the host system before each sending of a write command to a disk.

According to another characteristic, the period during which the power supply means must allow the proper functioning of the computer system corresponds to at least the time required for the data contained in each disk cache of a disk drive to be written onto the magnetic medium, plus the time lapse corresponding to the given monitoring interval between two interrogations of the monitoring means.

According to another characteristic, the device comprises an integrated circuit that monitors the backup electric power supply means and each main electric power supply device and that sends through the bus an interface signal for denying the bus's access to the host system during a given period so that no further command is transmitted to the disk drives.

A second object of the invention consists of offering a write-protected disk caching process that eliminates the drawbacks of the prior art.

This second object is achieved through the fact that the write-protected disk caching process of a computer system comprising at least one hard disk drive fed by at least one main electric power supply device and means for supplying backup power for a given duration, a host system linked by an adapter of the host system (host bus adapter), a bus to at least the disk drive and means for monitoring at least the electric power supply means and the main power supplies, characterized in that it comprises:

- a step for monitoring the backup power supply means and each electric power supply device,
- a step for indicating the state of the backup power supply means and of each electric power supply device,
- if the backup power supply means and the two electric power supply devices are all operational, the process comprises a step for enabling the write disk cache function; if not, the process comprises a backup step comprising a step for disabling the write disk cache function and a step for writing the data contained in the disk caches of the disk drives onto the magnetic media of the disk drives.

BRIEF DESCRIPTION OF THE DRAWINGS

Other characteristics and advantages of the present invention will emerge more clearly through the reading of the following description, written in reference to the attached drawings in which:

FIG. 1 represents a detailed diagram of the device according to the invention,

FIG. 2 represents a second variant of the utilization of the device according to the invention.

DESCRIPTION OF THE PREFERRED EMBODIMENTS

Figure 3A:
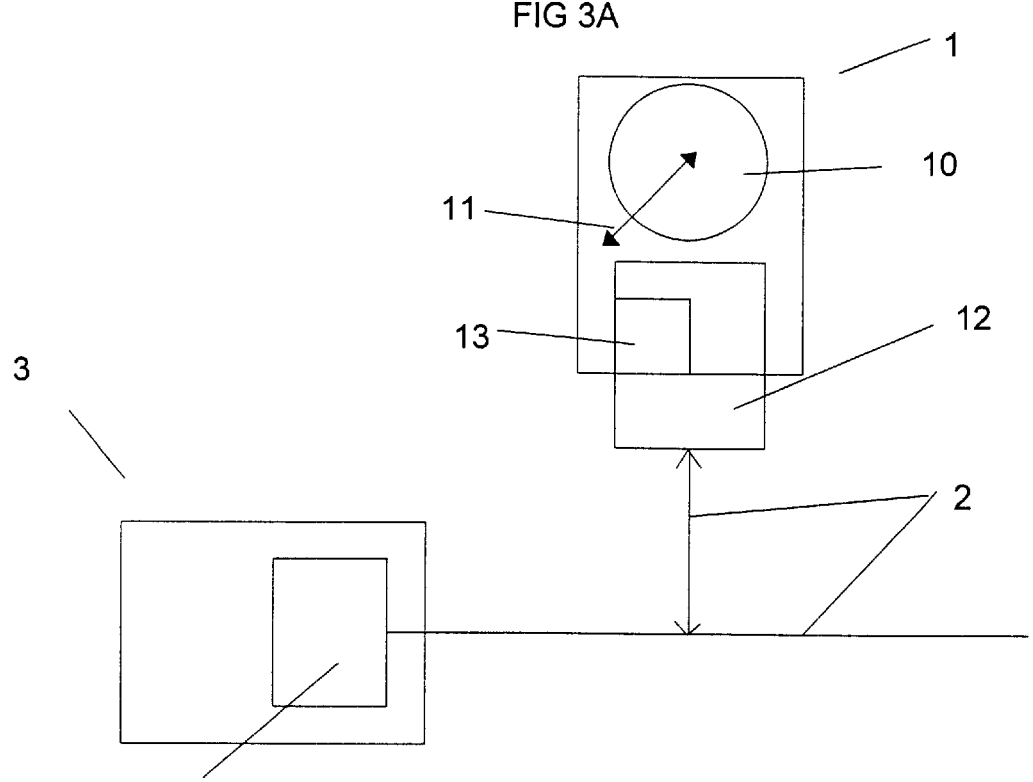
FIGS. 3A and 3B represent two variants of embodiment of a computer system of the prior art using the disk cache for the write operations onto the disk.

As explained above, FIG. 3A represents a hard disk drive (1) associated with a host system in a configuration of the prior art. In this configuration, the hard disk drive (1) comprises a functionality that makes it possible to use the disk cache (13) in the write operations onto the magnetic medium (10) of the disk drive (1), but with a substantial risk of data loss in case of a power supply cutoff, for the reasons explained above.

Figure 3B:
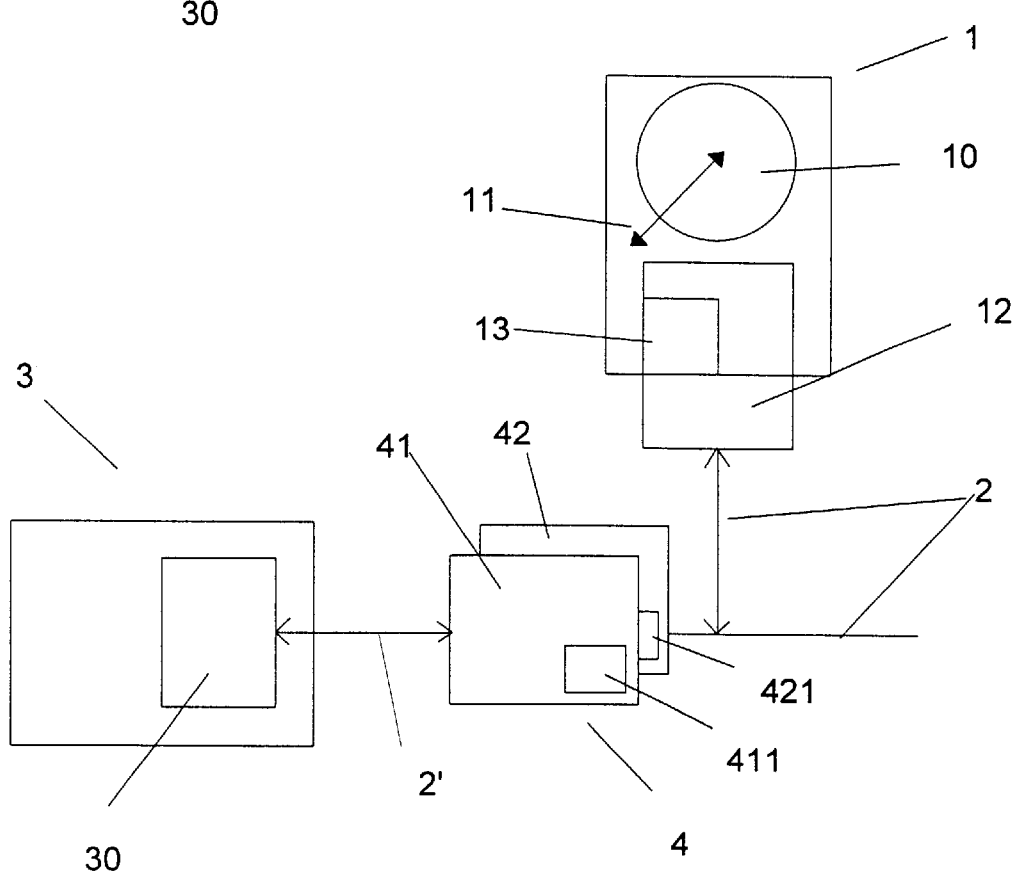

FIG. 3B represents another variant of the prior art using the write cache function for the write operation onto the magnetic disk. The disk drive (1) and the host system (3) are identical to those in FIG. 3A. The principle of this solution consists in inserting, into the bus (2) between the disk drive or drives (1) and the host system (3), a subsystem (4) that makes it possible to protect the writing of the data using the write cache function. This subsystem is, for example, a RAID (Redundant Array of Inexpensive Disks) subsystem. A RAID subsystem essentially comprises two controllers (41, 42) that respectively manage two caches (411, 412). The utilization of two controllers (41, 42) is done for the purpose of protection, in order to ensure the correct execution of the write operation even if one of the controllers (41, 42) is malfunctioning. This subsystem (4) also comprises means for delivering electric power and means for monitoring the main power supply or supplies. Thus, as soon as one of the main power supplies falls, one of the controllers of the RAID subsystem (4) disables the write disk cache function of the disk drive or drives (1) in order to prevent any risk of a data loss. The operation of this subsystem is as follows when the write disk cache function is authorized. First, the host system (3) sends a data write command through an interface (2') between the host system (3) and the RAID subsystem (4). The first controller (41) copies the data into a first cache (411), then into the second cache (421). Once the data are in the second cache (421), the first controller (41) sends the message "FIN OK" to the host system (3) and simultaneously starts the write operation onto the disk. As soon as the data is written onto the magnetic medium (10), the two caches (411, 412) are released. Thus, in this solution of the prior art, all of the write operations are controlled by the RAID subsystem. However, this solution, although it satisfactorily fulfills its function of protecting the integrity of the data, is very time-consuming since the controllers (41, 42) have an intrinsic processing time for the write commands. Furthermore, this solution is expensive since it is necessary to install two controllers and two additional disk caches.

Before describing the device according to the invention, it is appropriate to note once again that the write disk cache function already exists in the disks and that it is enabled, or not, by means of a command bit WCE sent by the system at the same time as the write command from the system through the interface. When one of the bits of the command WCE is set to the value 1, then the write cache function is authorized. When this same bit of WCE is set to the value 0, the write cache function is ignored. It should also be noted that this command can only be modified through the bus (2) between the disk (1) and the host system (3). Moreover, in the prior art, this command WCE is either permanently programmed into the connection driver of the bus adapter circuit (30) (HBA), which constitutes an interface from the host system (3) to the disk drive (1), or is modified by means of a write control subsystem such as the RAID subsystem described in FIG. 3B, i.e., a subsystem comprising at least one controller capable of performing this modification.

FIG. 1 represents a first variant of the utilization of the device according to the invention. In this variant, at least one disk drive (1a, 1b, 1c) and for example one other peripheral (7), are fed by a power supply circuit (21) connected to two main power supply devices (60, 61). It is within the capability of one skilled in the art to adapt the variant of FIG. 1 in order to implement a different number of main power supply devices. The two main power supply devices (60, 61) use the mains as the source of electric power. The device according to the invention also comprises means (62) for supplying backup power, such as for example a battery backup (BBU), to compensate for a malfunction of the two main power supply devices (60, 61) for a given duration, for example 1 minute. Each disk drive (1a, 1b, 1c) and each peripheral (7) is connected to the bus adapter circuit (30) (Host Bus Adapter) of a host system (3) by means of an interface (12a, 12b, 12c) a bus (2), for example of the SCSI type (SCSI: Small Computer System Interface) or the serial interface type (FIBER Channel), or any other type of interface.

The backup power supply means (62) comprise, for example, a battery that supplies, through the supply circuit (21), enough voltage for the normal operation of all of the disk drives (1a, 1b, 1c) for a given duration, in order to substitute for the main power supplies (60, 61) that are no longer supplying enough electric power. It is also possible to use an uninterruptible power supply system, called UPS (Uninterruptible Power Supply) by one skilled in the art, which is connected upstream from a main power supply (60, 61) and fulfills the same function as a battery. Any other backup power supply device could also be used. The minimum duration for which the backup power supply means (62) must supply power to all the disk drives corresponds to at least the time required for writing onto the magnetic media (10) the data contained in the disk cache or caches of the disk drives.

A monitoring device (5) constituted by electronic circuits is connected to the bus (2) between the host system (3) and the disk drive or drives (1a, 1b, 1c). This monitoring device (5) is connected in such a way that it is considered by the host system (3) as a separate peripheral just like the disk drive or drives (1a, 1b, 1c). This monitoring device (5) comprises means (50) for monitoring both the main power supplies (60, 61) and the backup power supply means (62). In order to perform this monitoring, the monitoring device (5) is electrically connected to the output of each of the main power supply devices (60, 61) and to the backup battery (62). This monitoring consists of checking and storing the operating state of the power supplies (60, 61) and the battery (62). The operating state is understood to include, first, the presence of the element, secondly its proper functioning, and third, whether or not it is ready to fulfill its function. Thus, for the battery (62), the monitoring device (5) verifies the presence, the proper functioning, i.e., whether the battery (62) is capable of supplying power, and finally, whether the battery (62) has enough of a charge to supply enough voltage for the backup power function for a given duration.

The monitoring device (5) can also monitor, for example, the proper functioning of at least one fan (63) and/or the temperature of the computer subsystem comprising all of the elements of FIG. 1 except the host system (3) and the bus (2). The temperature is measured by means of a temperature sensor (64).

Since the monitoring device (5) is connected by the bus (2) to the adapter circuit (30) of the host system (3) just like any another peripheral, this host system (3) therefore has extremely simple and fast access to the states of all the components monitored by the monitoring device (5), particularly to the states of the main power supply devices (60, 61) and the backup power supply means (62). In fact, the host system need only read the information stored by the monitoring device (5) according to the invention, for example using a read command sent through the bus (2) to the monitoring device (5). Thus, when the host system (3) knows, after having read the information stored by the monitoring device, (5) that the main power supply device (60, 61) is operating normally and that the backup power supply means (62) are ready to deliver power for a given duration, then all of the commands for writing onto each disk will be executed using the write cache function of the disks. The host system sends, in each write command, a command bit WCE set to 1. If, on the other hand, after reading the information from the monitoring device (5), it is established that either one of the main power supply devices (60, 61) is down or that the backup power supply means (62) is not ready, then the command bit WCE is set to 0 in all the write commands, which are then executed without the write cache function.

In order to avoid a reading of the information from the circuit (5) by the host system (3) with each write command, a periodic polling is implemented at the level of the host system (3), for example by means of an agent (31) such as a demon installed upstream from the driver (32) of the bus adapter circuit (30) (HBA) of the host system (3). In this case, it is the agent (31) that, at a given time interval, for example 10 seconds, polls the circuits (5) of the invention to check, through the contents of the storage registers of the circuits (5), the states of the main power supply devices (60, 61) and the backup power supply means (62). If these power supply means (60, 61, 62) are all operational, then the agent sets a flag indicating to the host system that the write cache function is authorized. If not, the flag is not set, indicating to the host system that the write cache function is not authorized. The implementation of this agent (31) also requires a slight modification of the driver (32) of the bus adapter circuit (30) (HBA) of the host system (3). In essence, as explained above, in the prior art, the write cache function is permanently programmed. This programming is done at the level of the driver of the HBA of the host system (3), which sends, in all write commands, either a command bit WCE set to 1 to authorize the write cache function, or a command bit WCE set to 0 to inhibit the write cache function. According to the invention, the driver of the adapter (HBA) is modified so that before each sending of a write command to a disk, the driver consults the flag set in a storage means of the host system (3) by the agent (31) in order to determine whether the command bit WCE should be set to 1 or whether the command bit WCE should be set to 0 in the write command.

Another functionality is provided in order to ensure complete integrity of the data, even during a power cutoff. This functionality consists of initiating, for each disk drive, the writing of the data contained in the disk cache (13) onto the magnetic medium (10) as soon as there is a power supply failure (mains cutoff or malfunction of the power supplies).

What happens is the following: the write cache function is enabled since in this case the power supply means (60, 61, 62) are operational. When a mains supply cutoff occurs, the backup power supply means (62) take over in order to continue supplying power to the disks, and simultaneously, the monitoring means (50) store the change in the state of the main power supply devices (60, 61). The change in the state of the two power supply devices (60, 61) also causes the disabling of the caching function. This information on the disabling of the write cache function is also stored by the monitoring means (50) and is therefore accessible to the host system (3). As soon as the agent (31) polls the monitoring means, the flag stored in the host system (3) changes its position, since the write cache function is no longer authorized. Consequently, the driver (32) of the bus adapter circuit (30) of the host system no longer sends the write commands using the write cache function, which has the result of protecting the write operations. Also, simultaneously, the agent (31) initiates the sending through the bus (2) of a known "flush" command which, for all of the disk drives, results in the writing onto the respective magnetic medium (10a, 10b, 10c) of each disk unit (1a, 1b, 1c) of the data contained in the disk caches (13a, 13b, 13c). The backup power supply means (62) are calibrated to supply the energy required for the proper functioning of all the disk drives (1a, 1b, 1c) for a duration at least equal to the sum of the existing time lapse between two pollings of the agent (31) and the time lapse required for all the disks (1a, 1b, 1c) to write the data from their respective caches (13a, 13b, 13c) onto the respective magnetic media (10a, 10b, 10c).

In an exemplary embodiment, the monitoring device (5) comprises an integrated circuit (50) developed specifically for this purpose, or a known type, for example GEM 200 (Guardian Enclosure Management) by Silicon Design Resource, which supports a standardized SAF TE (SCSI Access Fault Tolerant Enclosure) function for the remote monitoring of mass storage subsystems. This function allows the circuit (50) to store in real time, in bytes, the state of each element monitored, such as for example the main power supply devices (60, 61), the fans, or any other element that the user wishes to monitor. However, this integrated circuit does not initially include functions for monitoring a backup power supply means (62) such as a battery. Thus, according to the invention, certain information stored in bytes by the integrated circuit is redefined so that this integrated circuit also provides a state of the backup power supply means (62).

In the case where the SAF TE function is used to implement the device according to the invention, a first command of this function, which makes it possible to determine the configuration of all of the components monitored by the chip, i.e., the inventory of the components present, is redefined. Initially, the SAF TE function is used to monitor two fans and two power supplies. Theoretically, it is possible to monitor a third fan and a third power supply. According to the invention, the detection of a third fan and a third power supply is used to detect a backup power supply means such as a battery.

A second command of the SAF TE function makes it possible to determine the state of each component monitored by this circuit. As explained previously, the chip of the prior art is not equipped to provide information on the operating state, for example of a battery. Thus, for example, two existing functionalities in the circuit (50) are redefined in order to provide an operating state of a battery. A first functionality, initially provided for indicating the state of a third fan, is for example used to indicate, through a given value of a first specific byte stored in the circuit (50), the state of the battery. The battery can have three possible states, a first state in which the battery is present and is operational, a second state in which the battery is not operational, which means that the battery must be replaced or repaired, and a third state in which the battery is absent.

A second functionality, initially provided for indicating the state of a third power supply, and closely tied to the first functionality, makes it possible to indicate through a given value of a second specific byte stored in the circuit (50), whether the write cache function is authorized and whether the battery is ready. What happens is the following: either the specific byte assumes a first given value to indicate that the write cache function is authorized, or the specific byte can assume a second given value to indicate that the write cache function is not authorized, but that the battery (62) is ready to operate. Or, the specific byte assumes a third given value to indicate that the write cache function is not authorized and that the battery is not ready to operate.

Thus, the host system (3) need only read the second specific byte in order to then enable the write disk cache function or not. The reading of the is byte is done using a known read command (Read Enclosure Status) sent to the integrated circuit through the bus adapter circuit (30) and the bus (2).

It is the agent (31) used to perform the polling that executes the aforementioned read command.

The monitoring device (5) according to the invention also comprises, for example, a second integrated circuit (not represented). This second integrated circuit is also connected to the electric power supply devices (60, 61) and to the backup power supply means (62) in order to determine their operating states. As soon as an electric power supply device (60, 61) and/or the backup power supply means are no longer operational, the second integrated circuit produces a particular interface signal and sends it through the bus (2). This interface signal is itself known and makes it possible to render the bus inaccessible to the host system (3) for a given duration. This signal is commonly called a SCSI Hardware Reset. Thus, as soon as this interface signal is sent through the bus (2), no further command can be sent to the disk drives (1a, 1b, 1c), which allows each disk drive (1a, 1b, 1c) to finish the writing of the data contained in each disk cache (13a, 13b, 13c) onto each magnetic medium (10a, 10b, 10c). This second integrated circuit therefore makes it possible to increase the protection of the data. In fact, the disk caches (13a, 13b, 13c) are normally already empty when the "flush" command described above is activated.

FIG. 2 represents a second variant of the utilization of the device according to the invention. In this variant, the monitoring device (5) according to the invention is for example installed in an interface adapter card (8) of the prior art, for example of a direct disk attachment subsystem. In essence, as a general rule, an adapter card (8) is used to convert the signals exchanged between the adapter (30) of the host system (3) and the interfaces (12) of the disk drives (1a, 1b, 1c). Thus, by installing the monitoring device (5) according to the invention on this card (8), it is thereby connected to the interface of the host system (3). The monitoring device (5) according to the invention is identical to the one described in connection with the first variant of the utilization of the device of the invention.

It is also possible to install the monitoring device (5) according to the invention in a RAID system of the prior art, described in FIG. 3B, in order to improve its performance. Thus, with the system of the prior art, when the data is written into the first cache (411), it is then directly written into the cache (13a, 13b, 13c) of the disk drive (1a, 1b, 1c). Once the data has been written into the cache (13a, 13b, 13c) of the disk drive (1a, 1b, 1c), the latter sends the message "FIN OK" since the write cache function is authorized, and simultaneously the first cache (411) of the RAID subsystem is released.

It is understood that, according to the invention, the write cache function of the disks can be used while preserving the integrity of the data. Furthermore, the enabling of the write function is authorized, or not, through the reading of a single piece of information contained, for example, in a single specific byte of a monitoring integrated circuit. This fast access to this information through the interface between the disks (1a, 1b, 1c) and the host system (3) does not reduce the time savings obtained through the use of the write cache, unlike the use of a RAID type controller.

Moreover, the monitoring device (5) according to the invention is not installed on the data path, unlike in the system of the prior art, but performs the enabling of the write cache function parallel to the data flow, which has the result of not disturbing this flow and hence of retaining the maximum time savings from the write cache function of the disks.

For example, the average time that a write command takes to be executed by a disk is about 10 ms when the write cache function is not used, and about 2 ms when it is used. The solutions of the prior art using subsystems for controlling the writing onto the disks using the write cache function require an additional time for processing the write command of about 2 ms, resulting in a global time of about 4 ms.

Of course, the monitoring device (5) according to the invention could be applied just as easily to external mass storage subsystems as to internal disks. The monitoring device (5) according to the invention is also applicable to all types of interfaces. In the example described above, the monitoring device (5) according to the invention is connected to the functional interface (12) of the disk drives, but it is within the capability of one skilled in the art to use another interface to perform the monitoring of the power supplies and the backup power supply means without going beyond the scope of the invention.

The present description of the device applies to all disk drives comprising a magnetic medium, but the device according to the invention can also be applied to disk drives comprising an optical type of medium.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

What is claimed is:

1. Disk cache device for secure writing comprising a host system (3) an adapter (30) for linking the host system to a bus (2), an interface (12) and at least one hard disk drive (1), a backup power source (62) for supplying backup power for a given duration, and at least one power supply main device (60, 61) for supplying electric power to the disk drive, a monitor (50) for monitoring at least the backup power supply source (62) and the main power supply devices (60, 61), the host system including an interrogator (31), the monitor (50) being connected to the interface (2) and adapted to be interrogated by the interrogator (31) of the host system (3) so that the host system can enable a write disk cache function, or not, in write commands to be sent to the disk drive or drives (1a, 1b, 1c), in accordance with the information gathered by the monitor (50).

2. A disk cache device for secure writing according to claim 1, characterized in that the information gathered by the monitor (50) represents the operating state of each main power supply device (60, 61) and of the backup power supply source (62).

3. A disk cache device for secure writing according to claim 1, characterized in that a write cache function is enabled by the host system (3) in write commands as long as the main power supply devices (60, 61) and the backup power supply source (62) are operational.

4. A disk cache device for secure writing according to claim 2, characterized in that a write cache function is enabled by the host system (3) in write commands as long as the main power supply devices (60, 61) and the backup power supply source (62) are operational.

5. A disk cache device for secure writing according to claim 1, including a plurality of disk drives (1a, 1b, 1c), each having a corresponding disk cache (13a, 13b, 13c), the host system (3) being adapted to initiate writing of data contained in all the disk caches (13a, 13b, 13c) of the disk drives (1a, 1b, 1c) onto respective magnetic mediums (10a, 10b, 10c) as soon as the information gathered by the monitor (50) indicates that the main power supplies (60, 61) and the backup power supply means have failed.

6. A disk cache device for secure writing according to claim 2, including a plurality of disk drives (1a, 1b, 1c), each having a corresponding disk cache (13a, 13b, 13c), the host system (3) being adapted to initiate writing of data contained in all the disk caches (13a, 13b, 13c) of the disk drives (1a, 1b, 1c) onto respective magnetic mediums (10a, 10b, 10c) as soon as the information gathered by the monitor (50) indicates that the main power supplies (60, 61) and the backup power supply means have failed.

7. A disk cache device for secure writing according to claim 3, including a plurality of disk drives (1a, 1b, 1c), each having a corresponding disk cache (13a, 13b, 13c), the host system (3) being adapted to initiate writing of data contained in all the disk caches (13a, 13b, 13c) of the disk drives (1a, 1b, 1c) onto respective magnetic mediums (10a, 10b, 10c) as soon as the information gathered by the monitor (50) indicates that the main power supplies (60, 61) and the backup power supply means have failed.

8. A disk cache device for secure writing according to claim 4, including a plurality of disk drives (1a, 1b, 1c), each having a corresponding disk cache (13a, 13b, 13c), the host system (3) being adapted to initiate writing of data contained in all the disk caches (13a, 13b, 13c) of the disk drives (1a, 1b, 1c) onto respective magnetic mediums (10a, 10b, 10c) as soon as the information gathered by the monitor (50) indicates that the main power supplies (60, 61) and the backup power supply means have failed.

9. A disk cache device for secure writing according to claim 5, characterized in that the interrogator (31) comprises an agent installed at a level higher than that of a driver of the adapter (30) so as to perform a polling of the monitor (50) at a given time interval and set a flag indicating whether or not a write cache function is authorized, said flag being consulted by the adapter (30) of the host system (3) before each sending of a write command to at least one disk (1a, 1b, 1c).

10. A disk cache device for secure writing according to claim 6, characterized in that the interrogator (31) comprises an agent installed at a level higher than that of a driver of the adapter (30) so as to perform a polling of the monitor (50) at a given time interval and set a flag indicating whether or not a write cache function is authorized, said flag being consulted by the adapter (30) of the host system (3) before each sending of a write command to at least one disk (1a, 1b, 1c).

11. A disk cache device for secure writing according to claim 7, characterized in that the interrogator (31) comprises an agent installed at a level higher than that of a driver of the adapter (30) so as to perform a polling of the monitor (50) at a given time interval and set a flag indicating whether or not a write cache function is authorized, said flag being consulted by the adapter (30) of the host system (3) before each sending of a write command to at least one disk (1a, 1b, 1c).

12. A disk cache device for secure writing according to claim 8, characterized in that the interrogator (31) comprises an agent installed at a level higher than that of a driver of the adapter (30) so as to perform a polling of the monitor (50) at a given time interval and set a flag indicating whether or not a write cache function is authorized, said flag being consulted by the adapter (30) of the host system (3) before each sending of a write command to at least one disk (1a, 1b, 1c).

13. A disk cache device for secure writing according to claim 5, characterized in that the period during which the power supply source (62) must allow the proper functioning of the computer system corresponds to at least the time required for the data contained in each disk cache (13a, 13b, 13c) of a disk drive (1a, 1b, 1c) to be written onto the magnetic medium (10a, 10b, 10c) plus the required time lapse between two interrogations of the monitor (50).

14. A disk cache device for secure writing according to claim 6, characterized in that the period during which the power supply source (62) must allow the proper functioning of the computer system corresponds to at least the time required for the data contained in each disk cache (13a, 13b, 13c) of a disk drive (1a, 1b, 1c) to be written onto the magnetic medium (10a, 10b, 10c) plus the required time lapse between two interrogations of the monitor (50).

15. A disk cache device for secure writing according to claim 7, characterized in that the period during which the power supply source (62) must allow the proper functioning of the computer system corresponds to at least the time required for the data contained in each disk cache (13a, 13b, 13c) of a disk drive (1a, 1b, 1c) to be written onto the magnetic medium (10a, 10b, 10c) plus the required time lapse between two interrogations of the monitor (50).

16. A disk cache device for secure writing according to claim 8, characterized in that the period during which the power supply source (62) must allow the proper functioning of the computer system corresponds to at least the time required for the data contained in each disk cache (13a, 13b, 13c) of a disk drive (1a, 1b, 1c) to be written onto the magnetic medium (10a, 10b, 10c) plus the required time lapse between two interrogations of the monitor (50).

17. A disk cache device for secure writing according to claim 5, characterized in that it further comprises an integrated circuit that monitors the backup electric power supply source (62) and each main electric power supply device (60, 61) and that sends through the bus (2) an interface signal for denying the bus's access to the host system (3) during a given period so that no further command is transmitted to the disk drives (1a, 1b, 1c).

18. A disk cache device for secure writing according to claim 6, characterized in that it further comprises an integrated circuit that monitors the backup electric power supply source (62) and each main electric power supply device (60, 61) and that sends through the bus (2) an interface signal for denying the bus's access to the host system (3) during a given period so that no further command is transmitted to the disk drives (1a, 1b, 1c).

19. A disk cache device for secure writing according to claim 7, characterized in that it further comprises an integrated circuit that monitors the backup electric power supply source (62) and each main electric power supply device (60, 61) and that sends through the bus (2) an interface signal for denying the bus's access to the host system (3) during a given period so that no further command is transmitted to the disk drives (1a, 1b, 1c).

20. A disk cache device for secure writing according to claim 8, characterized in that it further comprises an integrated circuit that monitors the backup electric power supply source (62) and each main electric power supply device (60, 61) and that sends through the bus (2) an interface signal for denying the bus's access to the host system (3) during a given period so that no further command is transmitted to the disk drives (1a, 1b, 1c).

21. A disk cache device for secure writing according to claim 9, characterized in that it further comprises an integrated circuit that monitors the backup electric power supply source (62) and each main electric power supply device (60, 61) and that sends through the bus (2) an interface signal for denying the bus's access to the host system (3) during a given period so that no further command is transmitted to the disk drives (1a, 1b, 1c).

22. A disk cache device for secure writing according to claim 10, characterized in that it further comprises an integrated circuit that monitors the backup electric power supply source (62) and each main electric power supply device (60, 61) and that sends through the bus (2) an interface signal for denying the bus's access to the host system (3) during a given period so that no further command is transmitted to the disk drives (1a, 1b, 1c).

23. A disk cache device for secure writing according to claim 11, characterized in that it further comprises an integrated circuit that monitors the backup electric power supply source (62) and each main electric power supply device (60, 61) and that sends through the bus (2) an interface signal for denying the bus's access to the host system (3) during a given period so that no further command is transmitted to the disk drives (1a, 1b, 1c).

24. A disk cache device for secure writing according to claim 12, characterized in that it further comprises an integrated circuit that monitors the backup electric power supply source (62) and each main electric power supply device (60, 61) and that sends through the bus (2) an interface signal for denying the bus's access to the host system (3) during a given period so that no further command is transmitted to the disk drives (1a, 1b, 1c).

25. A disk cache device for secure writing according to claim 13, characterized in that it further comprises an integrated circuit that monitors the backup electric power supply source (62) and each main electric power supply device (60, 61) and that sends through the bus (2) an interface signal for denying the bus's access to the host system (3) during a given period so that no further command is transmitted to the disk drives (1a, 1b, 1c).

26. A disk cache device for secure writing according to claim 14, characterized in that it further comprises an integrated circuit that monitors the backup electric power supply source (62) and each main electric power supply device (60, 61) and that sends through the bus (2) an interface signal for denying the bus's access to the host system (3) during a given period so that no further command is transmitted to the disk drives (1a, 1b, 1c).

27. A disk cache device for secure writing according to claim 15, characterized in that it further comprises an integrated circuit that monitors the backup electric power supply device (60, 61) and that sends through the bus (2) an interface signal for denying the bus's access to the host system (3) during a given period so that no further command is transmitted to the disk drives (1a, 1b, 1c).

28. A disk cache device for secure writing according to claim 16, characterized in that it further comprises an integrated circuit that monitors the backup electric power supply source (62) and each main electric power supply device (60, 61) and that sends through the bus (2) an interface signal for denying the bus's access to the host system (3) during a given period so that no further command is transmitted to the disk drives (1a, 1b, 1c).

29. A method for secure writing in a computer system comprising at least one hard disk drive (1a, 1b, 1c) fed by at least one main electric power supply device (60, 61) and a backup electric power supply (62) for supplying power for a given duration, a host system (3) linked by an adapter (30) of the system and a bus (2) to at least the disk drive, and a monitor (50) for monitoring at least the backup electric power supply source (62) and the main power supply devices (60, 61), characterized in that the method comprises:

monitoring the backup power supply source (62) and each electric power supply device (60, 61), indicating the state of the backup power supply means (62) and of each electric power supply device (60, 61), enabling a write disk cache function if the backup power supply means (62) and the two electric power supply devices (60, 61) are all operational, and, if not, providing a backup step for disabling the write disk cache function and a step for writing the data contained in the disk caches (13a, 13b, 13c) of the disk drives (1a, 1b, 1c) onto magnetic media (10a, 10b, 10c) of the disk drives (1a, 1b, 1c).

* * * * *